(12) United States Patent
Brand et al.

(10) Patent No.: US 12,372,158 B2
(45) Date of Patent: Jul. 29, 2025

(54) SANITARY FITTING WITH AN OPERATING ELEMENT FOR A MIXING VALVE

(71) Applicant: Grohe AG, Hemer (DE)

(72) Inventors: Henning Brand, Dortmund (DE); Sebastian Kukla, Bochum (DE); Jonas Kick, Menden (DE)

(73) Assignee: GROHE AG, Hemer (DE)

(*) Notice: Subject to any disclaimer, the term of this patent is extended or adjusted under 35 U.S.C. 154(b) by 87 days.

(21) Appl. No.: 18/284,684

(22) PCT Filed: Mar. 17, 2022

(86) PCT No.: PCT/EP2022/056980
§ 371 (c)(1),
(2) Date: Nov. 7, 2023

(87) PCT Pub. No.: WO2022/207339
PCT Pub. Date: Oct. 6, 2022

(65) Prior Publication Data
US 2024/0183455 A1  Jun. 6, 2024

(30) Foreign Application Priority Data
Mar. 30, 2021  (DE) .......................... 102021108029.0

(51) Int. Cl.
*F16K 11/072* (2006.01)
*F16K 31/46* (2006.01)
*F16K 31/53* (2006.01)

(52) U.S. Cl.
CPC .......... *F16K 11/072* (2013.01); *F16K 31/465* (2013.01); *F16K 31/535* (2013.01)

(58) Field of Classification Search
CPC .... F16K 11/072; F16K 31/605; F16K 19/006; E03C 1/0412
See application file for complete search history.

(56) References Cited

U.S. PATENT DOCUMENTS 5,293,901 A * 3/1994 Guzzini ................ F16K 11/074
137/613
5,467,799 A    11/1995 Buccicone et al.
7,458,112 B1 * 12/2008 Yang ........................ E03C 1/066
4/570
(Continued)

FOREIGN PATENT DOCUMENTS

DE    10 2008 055 713    5/2010

OTHER PUBLICATIONS

Machine Translation DE102008055713A1 (Year: 2010).*
(Continued)

*Primary Examiner* — Michael R Reid
(74) *Attorney, Agent, or Firm* — Wenderoth, Lind & Ponack, L.L.P.

(57) ABSTRACT

A sanitary faucet (1) having a mixing valve (2) for mixing cold water and warm water to form mixed water having a desired mixed-water temperature, wherein the mixed-water temperature can be set by rotating a control disk (3) of the mixing valve about a first axis of rotation (4); and a first control element (5), which can be rotated about a second axis of rotation (6) for actuating the control disk (3), wherein the second axis of rotation (6) does not extend in parallel to the first axis of rotation (6).

21 Claims, 3 Drawing Sheets

(56) References Cited

U.S. PATENT DOCUMENTS

Figure 1:
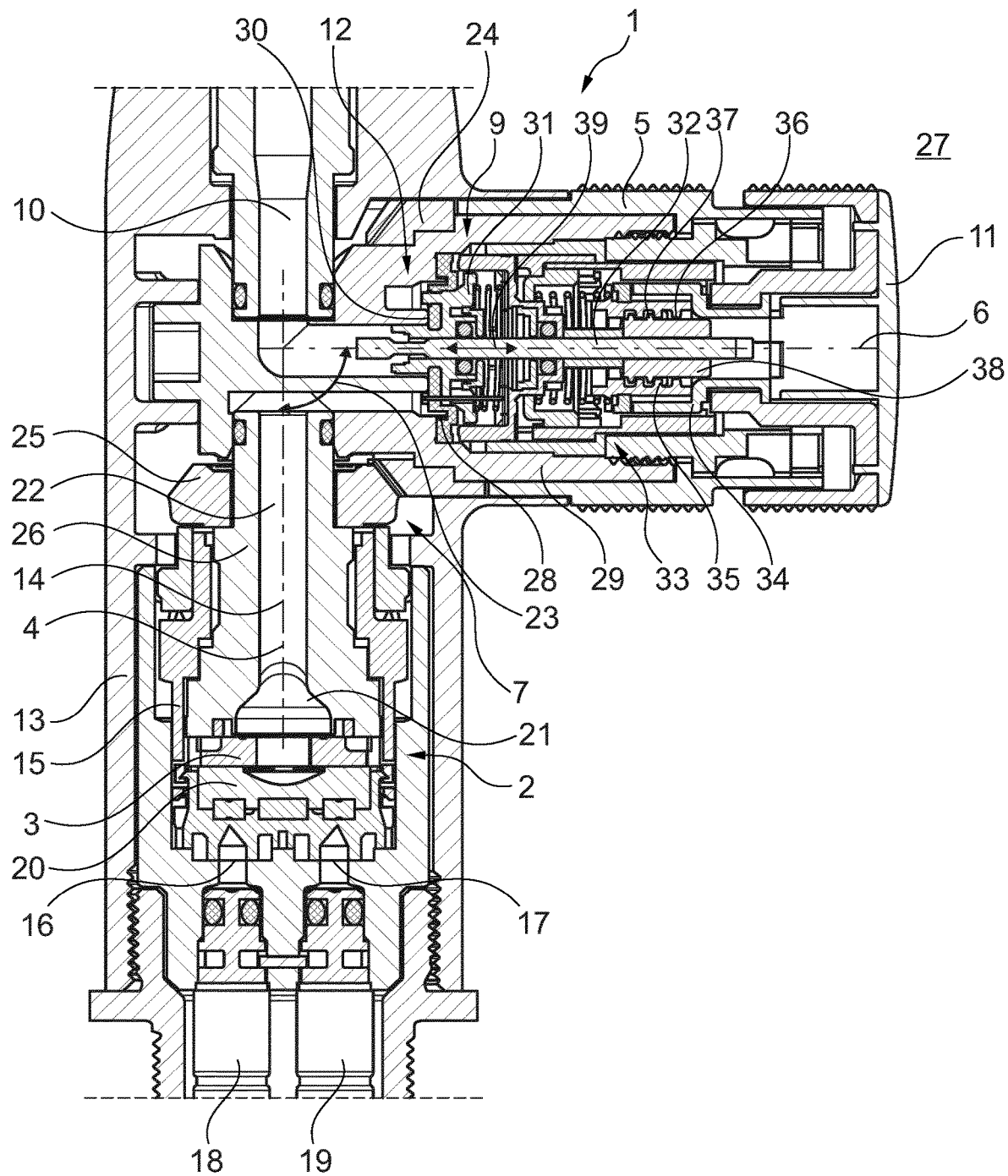

| | | | | |
|---|---|---|---|---|
| 7,748,649 | B2* | 7/2010 | Fujii | E03C 1/066 |
| | | | | 239/548 |
| 9,234,606 | B2* | 1/2016 | Bock-Aronson | F16K 31/53 |
| 10,184,575 | B2* | 1/2019 | Tasserit | E03C 1/0412 |
| 2006/0174946 | A1 | 8/2006 | Kajuch | |

OTHER PUBLICATIONS

Machine Translation DE102008055713 (Year: 2010).*
International Search Report issued Jul. 8, 2022 in International (PCT) Application No. PCT/EP2022/056980.

* cited by examiner

SANITARY FITTING WITH AN OPERATING ELEMENT FOR A MIXING VALVE

This invention relates to a sanitary faucet. Such sanitary faucets are used, in particular, to provide a liquid on demand at a washbasin, sink, shower and/or bathtub.

Sanitary faucets can comprise a mixing valve for mixing cold water and warm water to form mixed water having a desired mixed-water temperature. For this purpose, the cold water can be supplied to the mixing valve via a cold water supply line and the warm water via a warm water supply line. The mixed-water temperature can be set using a control element disposed on a faucet housing of the sanitary faucet. A discharge quantity of the mixed water can be controlled by a valve. Such a valve is known from EP 1 903 267 A1, for instance. A disadvantage of the known sanitary faucets is that a large installation space is required for the mixing valve and the control element.

Therefore, the invention addresses the problem of solving at least part of the problems described with reference to the prior art and, in particular, of providing a sanitary faucet that can be designed in a more compact manner.

This problem is solved by a sanitary faucet according to the features of the independent claim. Further advantageous embodiments of the valve are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary faucet having at least the characteristics listed below contributes thereto:
- a mixing valve for mixing cold water and warm water to form mixed water having a desired mixed-water temperature, wherein the mixed-water temperature can be set by rotating a control disk of the mixing valve about a first axis of rotation; and
- a first control element that can be rotated about a second axis of rotation for actuating the control disk, wherein the second axis of rotation does not extend in parallel to the first axis of rotation.

The sanitary faucet is used for instance to provide a liquid, in particular water, at a sink, washbasin, shower and/or bathtub. The sanitary faucet may have a faucet housing that is preferably at least partially made of (cast) metal, such as brass, and/or plastic. The faucet housing can have an outlet that is rigidly or movably secured to the faucet body, in particular in a swiveling and/or at least partially extendable manner. The faucet housing and/or the outlet may have at least one outlet opening for the liquid. The liquid can be discharged via the at least one outlet opening, in particular to an environment of the sanitary faucet. In particular, the faucet housing can be attached to a support, such as a countertop, a vanity, the sink or wash basin. For this purpose, the support can have a mounting opening, into which a mounting section of the faucet housing can be inserted and/or to which a fastening element of the faucet housing can be fastened, for instance in the manner of a nut.

The sanitary faucet comprises a mixing valve for mixing cold water and warm water to form mixed water having a desired mixed-water temperature. The mixing valve is disposed in particular in the faucet housing or a lower part of the faucet housing. The cold water can be supplied to the mixing valve in particular via a cold water line and the warm water via a warm-water line. The cold water can have a cold-water temperature which is in particular at most 25° C. (Centigrade), preferably 1° C. to 25° C., particularly preferably 5° ° C. to 20° C. The hot water can have a hot-water temperature that is in particular at most 90° C., preferably 25° C. to 90° C., particularly preferably 55° C. to 65° C. The mixed-water temperature can be set by rotating a control disk of the mixing valve about a first axis of rotation. For instance, the first axis of rotation may extend in parallel to and/or coaxially to a longitudinal axis of the faucet housing. The control disk can, for instance, be designed in the manner of a dynamic control disk that can be adjusted relative to a stationary control disk. Furthermore, the control disks can be designed in the manner of valve disks and/or be at least partially made of ceramic. The stationary control disk is in particular (fixedly) disposed in a mixing valve housing of the mixing valve. Furthermore, the stationary control disk may have a cold-water passage opening for the cold water and/or a warm-water passage opening for the warm water. The cold-water passage opening and/or the warm-water passage opening extend in particular in parallel to the first axis of rotation through the stationary control disk. In particular, the control disk lies on the stationary control disk in a planar manner and/or can be rotated about the first axis of rotation in such a way that an opening cross-section of the cold-water passage opening and/or an opening cross-section of the warm-water passage opening of the static control disk can be changed. For this purpose, the dynamic control disk can have at least one control opening that extends through the control disk, in particular in parallel to the first axis of rotation. By turning the control disk on the stationary control disk, in particular a mixing ratio can be set between the cold water and the warm water in a mixing chamber of the mixing valve. For instance, the cold water and warm water can be supplied to the mixing valve via a first longitudinal end of the mixing valve and the mixed water can be discharged from the mixing valve via a second longitudinal end of the mixing valve. In particular, the first longitudinal end and the second longitudinal end are located on opposite (axial) ends of the mixing valve. In other words, this can also mean that media can axially flow through the mixing valve, i.e., for instance, parallel to the longitudinal axis of the faucet housing.

Further, the sanitary faucet has a first control element that can be rotated about a second axis of rotation to actuate the control disk. The first control element can, for instance, be designed in the manner of a lever, rotary handle or rotary knob. Furthermore, the first control element can be designed to be at least partly sleeve-shaped and/or tubular. For instance, the first control element can be disposed on the faucet housing or an outer surface of the faucet housing. In addition, the first control element may be rotatable about the second axis of rotation, in particular by a user of the sanitary faucet. The second axis of rotation does not extend in parallel to the first axis of rotation. In other words, this can mean that the second axis of rotation is oblique to the first axis of rotation. The first axis of rotation and the second axis of rotation can intersect. In addition, the first axis of rotation and the second axis of rotation can extend in particular at an angle of 30° to 150°, preferably 70° to 110°, particularly preferably (substantially) 90°, relative to one another. This makes for a compact design of the sanitary faucet.

The first control element can be connected to the control disk via a first transmission. The first transmission can be a miter gear, for instance.

The first transmission can be a bevel-gear pair. The bevel-gear pair may include a first bevel gear and a second bevel gear. In particular, the first bevel gear can be connected to the first control element. Furthermore, the second bevel gear can be connected in particular to the control disk or a driver element of the control disk.

The first control element can be connected to the control disk via a universal joint, a flexible shaft, a Bowden cable and/or a bellows.

The first control element can be connected to the control disk via a second transmission. The second transmission can, for instance, be designed in the manner of a preliminary transmission stage of the first transmission. Furthermore, the second transmission can be disposed between the first control element and the first transmission in a direction of the power flow. A transmission ratio of the second transmission can be greater than 1 in particular, such that the first control element can be used to actuate the control disk in a particularly sensitive and/or smooth manner.

The sanitary faucet may include a valve for opening and closing a mixed-water duct, wherein the valve can be actuated by a second control element. The mixed-water duct is, in particular, a liquid line through which the mixed water can be routed, in particular, to the at least one outlet opening of the sanitary faucet. The valve can be disposed in a flow direction of the mixed water, in particular downstream of the mixing valve. Furthermore, the valve can be designed in the manner of a diaphragm valve, for instance. For this purpose, the valve has, in particular, a diaphragm, which can, for instance, be made at least partially of an elastic material, such as rubber. In particular, the diaphragm may be designed to be round and/or attached to the valve housing. The diaphragm is attached to the valve body, particularly in its radially outer area. In a closed position of the valve, the diaphragm rests in particular against an (annular) valve seat. In particular, the valve seat is formed at a longitudinal end of the mixed-water duct. Furthermore, the valve seat can extend around the spindle. In the closed position, the diaphragm closes the mixed-water duct such that no mixed water can drain via the mixed-water duct or the at least one outlet opening. To actuate the valve, the diaphragm can be guided by a spindle that is connected to the second control element. In particular, this may mean that the diaphragm can be adjusted by the spindle in parallel to the second axis of rotation. The diaphragm may be attached to a diaphragm holder through which the spindle extends. The diaphragm holder is in particular a (hard) plastic part. The diaphragm holder can be connected to the diaphragm via a snap-in connection, for instance. The second control element can be designed in particular in the manner of a push button. Furthermore, the second control element can be rotatable (by the user of the valve) in particular about the second axis of rotation and/or adjustable in parallel to the second axis of rotation. In particular, the spindle is firmly connected to the second control element so that the spindle can be moved with the second control element. In particular, the spindle extends in parallel to and/or coaxially to the second axis of rotation.

The valve may be adjustable between an open position and a closed position by pressing the second control element. For this purpose, the second control element is connected in particular to a snap device that locks the second control element in the open position and/or the closed position. Such snap devices are known to the person skilled in the art. By pressing the second control element, the second control element with the spindle can be adjusted in particular into the valve housing such that the diaphragm of the valve is guided onto the valve seat and the valve is in the closed position. The second control element is held in this position by the snap device until the second control element is pressed again. By pressing the second control element, the second control element is released by the snap device and moved away from the valve housing, in particular by spring force, until the valve or the diaphragm is in the open position. In the open position, the diaphragm is lifted off the diaphragm seat for the mixed water to be able to drain via the mixed-water duct or the at least one outlet opening. The valve can be designed in the manner of a so-called push valve. Furthermore, in particular if the sanitary faucet is mounted on the support, the valve may be disposed above the mixing valve.

A volumetric flow rate of the mixed water can be set by turning the second control element. For this purpose, the second control element and/or the spindle can be adjusted by rotating the second control element relative to the valve housing in parallel to the second axis of rotation. By turning the second control element, in particular an opening stroke of the valve or diaphragm can be set. The opening stroke is in particular a travel distance by which the diaphragm is lifted from the valve seat in the open position of the valve, or a distance between the diaphragm and the valve seat in the open position of the valve. The travel or distance is measured in particular in parallel to the second axis of rotation. The greater the travel or distance is set by turning the second control element, the greater the volumetric flow rate of the mixed water becomes. The smaller the travel or distance is set by turning the second control element, the smaller the volumetric flow rate of the mixed water becomes.

The second control element can be rotatable about the second axis of rotation. In particular, the volumetric flow rate of the mixed water can be set by rotating the second control element about the second axis of rotation.

The first control element and the second control element can be disposed coaxially to each other. Furthermore, the first control element and the second control element can be disposed coaxially on one end of the faucet housing. The second control element can at least partially encompass the first control element. In addition, the first control element and the second control element may be disposed coaxially with respect to each other on opposite ends of the faucet housing.

Figure 2:
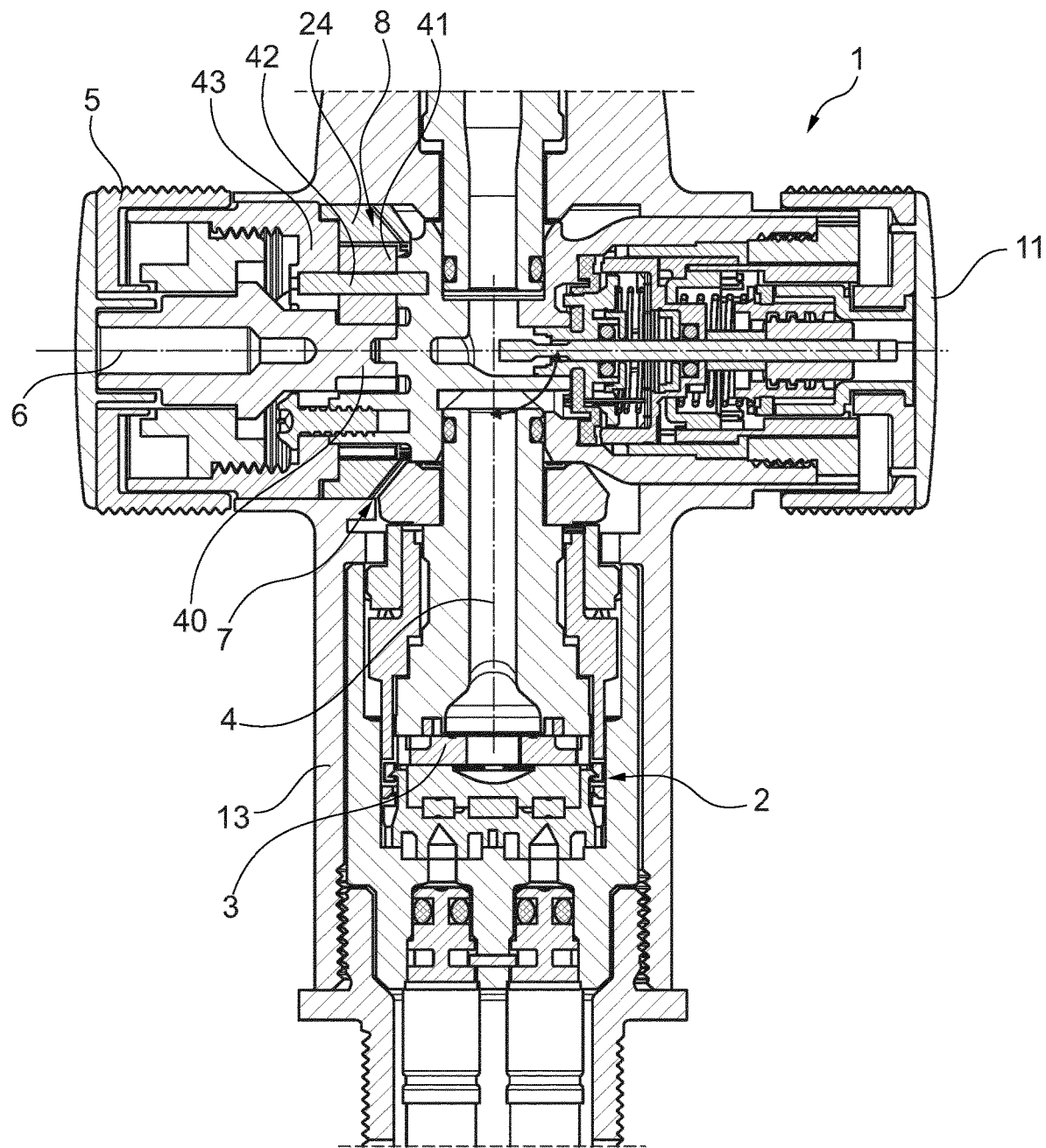
Figure 3:
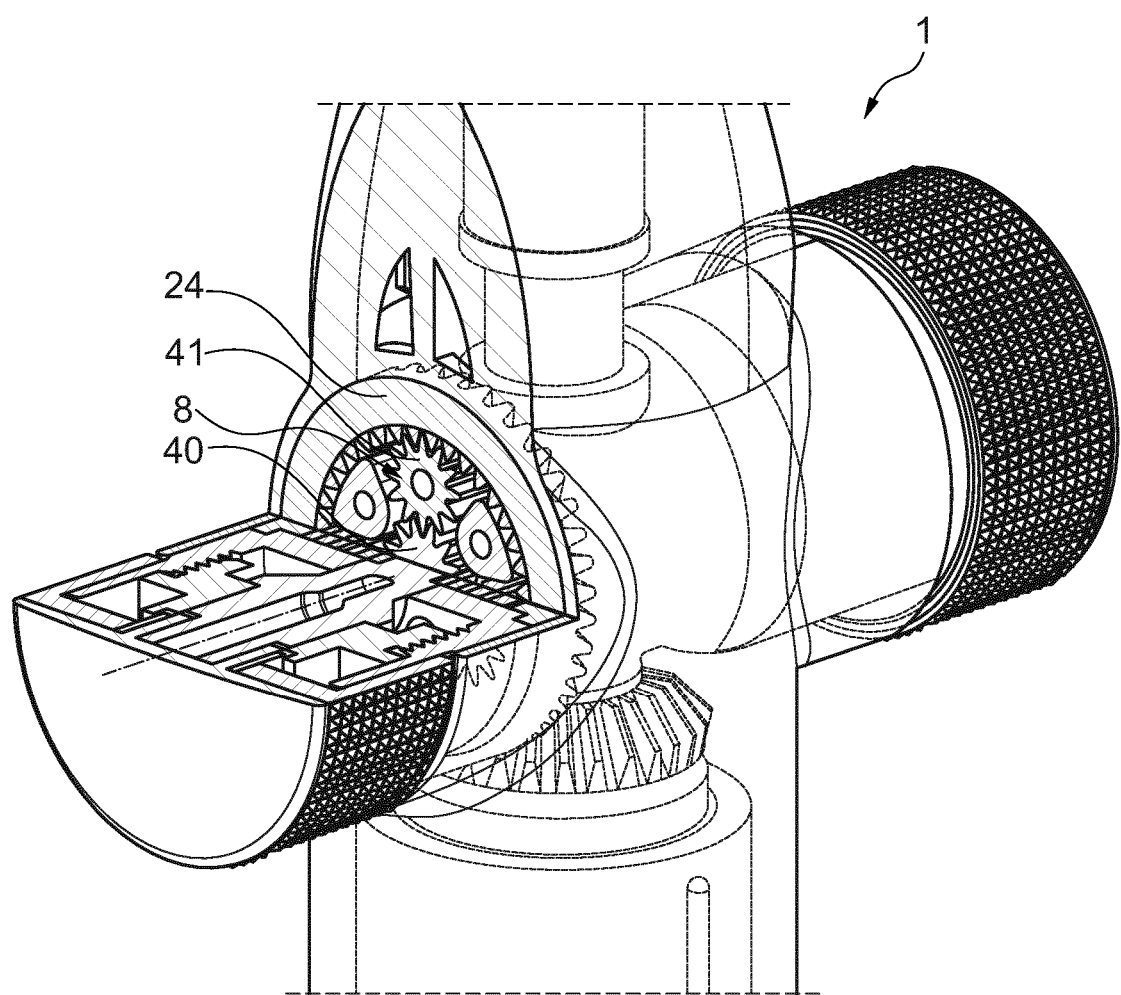

The invention and the technical environment are explained in more detail below with reference to the figures. It should be noted that the figures show particularly preferred variants of the embodiment of the invention, but the invention is not limited thereto. The same reference numerals are used for the same components in the figures. In an exemplary and schematic manner, FIG. 1 shows a longitudinal section of a first variant of the embodiment of a sanitary faucet;

FIG. 2 shows a longitudinal section of a second variant of the embodiment of a sanitary faucet; and FIG. 3 shows a perspective partial section of the second variant of the embodiment of the sanitary faucet.

FIG. 1 shows a longitudinal section of a first variant of the embodiment of a sanitary faucet 1, wherein only a partial view of the sanitary faucet 1 is shown. The sanitary faucet 1 has a faucet housing 13 that can be attached to a support not shown here and extends along a longitudinal axis 14. A mixing valve 2 is disposed in the faucet housing 13, which mixing valve has a mixing valve housing 15 having a cold-water intake 16 and a warm-water intake 17. The cold-water intake 16 can be supplied with cold water via a cold-water intake 18 and with warm water via a warm-water intake 19. A control disk 3 is disposed in the mixing valve housing 15, which is designed as a dynamic control disk and can be rotated about a first axis of rotation 4 relative to a stationary control disk 20 by a first control element 5. Here, the first axis of rotation 4 of the 10) control disk 3 extends coaxially to the longitudinal axis 14 of the faucet housing 13. The first control element 5 is shaped like a sleeve and designed in the manner of a rotary handle. Furthermore, the first control element 5 can be rotated about a second axis of rotation 6, which extends at an angle 23 of 90° to the first axis of rotation 4. In addition, the first control element 5 is connected to the control disk 3 via a first transmission 7. The first transmission 7 is designed in the manner of a bevel-gear pair and has a first bevel gear 24 and a second bevel gear 25. The first bevel gear 24 is connected to the first control element 5 for co-rotation and can be rotated about the second axis of rotation 6 by the first control element 5. Further, the first bevel gear 24 is engaged with the second bevel gear 25 such that the second bevel gear 25 can be rotated about the first axis of rotation 4 by the first bevel gear 24. The second bevel gear 25 is connected to a driver element 26 of the control disk 3, such that a rotational motion of the second bevel gear 25 results in a rotational motion of the control disk 3 about the first rotational axis 4. The stationary control disk 20 is designed to be non-rotatable relative to the mixing valve housing 15 and has a cold-water passage opening for the cold water, which is not shown here, and a warm-water passage opening for the warm water, which is also not shown here. By rotating the control disk 3 about the first axis of rotation 4, an opening cross-section of the cold-water passage opening and the warm-water passage opening of the stationary control disk 20 can be altered such that a mixing ratio of the cold water and warm water in a mixing chamber 21 of the mixing valve 2 can be set. For this purpose, the control disk 3 has a control opening that is not shown here. Therefore, by rotating the first control element 5, a mixed-water temperature of a mixed water formed in the mixing chamber 21 can be set.

The mixed water can then be supplied to a valve 9 for opening and closing a mixed-water duct 10 via a liquid duct 22. The valve 9 is designed in the manner of a diaphragm valve and comprises a diaphragm 28, which is radially attached to the outside of a valve housing 29 and, in a closed position 12 of the valve 9 shown here, is seated on an annular valve seat 30. The annular valve seat 30 is formed at a longitudinal end of the mixed-water duct 10. The diaphragm 28 is attached to a diaphragm holder 31, through which a spindle 32 extends. The spindle 32 is connected to a second control element 11. The second control element 11 is designed in the manner of a rotatable push button, which can be rotated about the second axis of rotation 6 and can be adjusted in parallel to the second axis of rotation 6. In the closed position 12 of the valve 9 shown here, the second control element 11 is in a pressed position or in a position displaced in the direction of the valve housing 29, in which the second control element 11 is held by a snap device 33. In this way, the diaphragm 28 is guided over the spindle 32 onto the valve seat 30 to close the mixed-water duct 10. By pressing the second control element 11 again, the second control element 11 can be moved to the right or away from the valve housing 29 in parallel to the second axis of rotation 6, such that the spindle 32 lifts the diaphragm 28 off the valve seat 30, such that the valve 9 is in an open position. Thus, when the valve 9 is in the open position, the mixed water can flow from the liquid duct 22 into the mixed-water duct 10 and then exit the sanitary faucet 1 into an environment 27 surrounding the sanitary faucet 1 from a mixed-water drain not shown here.

The second control element 11 is connected to a pressure element 34 for co-rotation, in which pressure element a threaded sleeve 35 is in turn disposed for co-rotation. The threaded sleeve 35 has a female thread 36 that engages with a male thread 37 of a connecting sleeve 38. The connection sleeve 38 is firmly connected to the spindle 32. When the second control element 11 is rotated about the second axis of rotation 6, the pressure element 34 and the threaded sleeve 35 are rotated about the second axis of rotation 6 with the second control element 11, thereby adjusting the connecting sleeve 38 with the spindle 32 in parallel to the second axis of rotation 6. By adjusting the spindle 32 in parallel to the second axis of rotation 6, an opening stroke 39 of the valve 9 or the diaphragm 28 can be altered. By rotating the second control element 11 about the second axis of rotation 6, a volumetric flow rate of the mixed water flowing off via the mixed-water duct 10 can be set. The first control element 5 and the second control element 11 are disposed together on one side of the faucet housing 13 and coaxially with each other.

FIG. 2 shows a longitudinal section of a second variant of the embodiment of the sanitary faucet 1, wherein only a partial view of the sanitary faucet 1 is shown as in FIG. 1. The second variant of the embodiment of the sanitary faucet 1 differs from the first variant of the embodiment of the sanitary faucet 1 in that the first control element 5 and the second control element 11 are disposed coaxially with respect to each other on opposite ends of the faucet housing 13. Furthermore, the first control element 5 is connected to the control disk 3 of the mixing valve 2 via the first transmission 7 and a second transmission 8. The second transmission 8 is designed in the form of an epicyclic gear unit or planetary gear set. The first control element 5 has a bull gear 40, which can be rotated about the second axis of rotation 6 via the first control element 5. External teeth of the bull gear 40 mesh with external teeth of a planetary wheel 41, which is held stationary on a housing component 43 by an axle 42. The first bevel gear 24 of the first transmission 7 is designed in the manner of a ring gear and has internal teeth that mesh with the external teeth of the planetary wheel 41. A rotational motion of the first control element 5 about the second axis of rotation 6 is thereby transmitted to the first bevel gear 24 of the first transmission 7 via the bull gear 40 and the planetary wheel 41, such that the control disk 3 can be rotated about the first axis of rotation 4. A transmission ratio of the second transmission 8 is greater than 1, such that the control disk 3 can be actuated smoothly via the first control element 5.

FIG. 3 shows a perspective representation of a second variant of the embodiment of the sanitary faucet 1. In particular, FIG. 3 shows the planetary wheel 41 of the second transmission 8 meshing with the bull gear 40 and the first bevel gear 24.

This invention enables a sanitary faucet to be made in a particularly compact manner.

LIST OF REFERENCES 1 sanitary faucet
2 mixing valve
3 control disk
4 first axis of rotation
5 first control element
6 second axis of rotation
7 first transmission
8 second transmission
9 valve
10 mixed-water duct
11 second control element 12 closed position
13 faucet housing
14 longitudinal axis
15 mixing valve housing
16 cold-water intake
17 warm-water intake
18 cold-water line
19 warm-water line
20 stationary control disk
21 mixing chamber
22 liquid duct
23 angle
24 first bevel gear
25 second bevel gear
26 driver element
27 environment
28 diaphragm
29 valve body
30 valve seat
31 diaphragm holder
32 spindle
33 snap device
34 pressure element
35 threaded sleeve
36 female thread
37 male thread
38 connecting sleeve
39 opening stroke
40 bull gear
41 planetary wheel
42 axle
43 housing component

The invention claimed is:

1. A sanitary faucet (1) comprising:
a mixing valve (2) for mixing cold water and warm water to form mixed water having a desired mixed-water temperature, wherein the mixed-water temperature can be set by rotating a control disk (3) of the mixing valve (2) about a first axis of rotation (4);
a first control element (5), which can be rotated about a second axis of rotation (6) for actuating the control disk (3), wherein the second axis of rotation (6) does not extend in parallel to the first axis of rotation (4), and
a valve (9) for opening and closing a mixed-water duct (10), wherein the valve (9) can be actuated by a second control element (11), wherein a volumetric flow rate of the mixed water can be set by turning the second control element (11), and wherein the valve (9) can be adjusted between an open position and a closed position (12) by pressing the second control element (11).

2. The sanitary faucet (1) according to claim 1, wherein the first control element (5) is connected to the control disk (3) via a first transmission (7).

3. The sanitary faucet (1) according to claim 2, wherein the first transmission (7) is a bevel-gear pair.

4. The sanitary faucet (1) according to claim 1, wherein the first control element (5) is operatively connected to the control disk (3).

5. The sanitary faucet (1) according to claim 1, wherein the first control element (5) is connected to the control disk (3) via a second transmission (8).

6. The sanitary faucet (1) according to claim 1, wherein the second control element (11) can rotate about the second axis of rotation (6).

7. The sanitary faucet (1) according to claim 1, wherein the first control element (5) and the second control element (11) are disposed coaxially with respect to each other.

8. A sanitary faucet (1) comprising:
a mixing valve (2) for mixing cold water and warm water to form mixed water having a desired mixed-water temperature, wherein the mixed-water temperature can be set by rotating a control disk (3) of the mixing valve (2) about a first axis of rotation (4);
a first control element (5), which can be rotated about a second axis of rotation (6) for actuating the control disk (3), wherein the second axis of rotation (6) does not extend in parallel to the first axis of rotation (4), and
a valve (9) for opening and closing a mixed-water duct (10), wherein the valve (9) can be actuated by a second control element (11), wherein a volumetric flow rate of the mixed water can be set by turning the second control element (11), and wherein the second control element (11) can rotate about the second axis of rotation (6).

9. The sanitary faucet (1) according to claim 8, wherein the first control element (5) is connected to the control disk (3) via a first transmission (7).

10. The sanitary faucet (1) according to claim 9, wherein the first transmission (7) is a bevel-gear pair.

11. The sanitary faucet (1) according to claim 8, wherein the first control element (5) is operatively connected to the control disk (3).

12. The sanitary faucet (1) according to claim 8, wherein the first control element (5) is connected to the control disk (3) via a second transmission (8).

13. The sanitary faucet (1) according to claim 8, wherein the first control element (5) and the second control element (11) are disposed coaxially with respect to each other.

14. A sanitary faucet (1) comprising:
a mixing valve (2) for mixing cold water and warm water to form mixed water having a desired mixed-water temperature, wherein the mixed-water temperature can be set by rotating a control disk (3) of the mixing valve (2) about a first axis of rotation (4);
a first control element (5), which can be rotated about a second axis of rotation (6) for actuating the control disk (3), wherein the second axis of rotation (6) does not extend in parallel to the first axis of rotation (4), and
a valve (9) for opening and closing a mixed-water duct (10), wherein the valve (9) can be actuated by a second control element (11), and wherein the first control element (5) and the second control element (11) are disposed coaxially with respect to each other.

15. The sanitary faucet (1) according to claim 14, wherein the first control element (5) is connected to the control disk (3) via a first transmission (7).

16. The sanitary faucet (1) according to claim 15, wherein the first transmission (7) is a bevel-gear pair.

17. The sanitary faucet (1) according to claim 14, wherein the first control element (5) is operatively connected to the control disk (3).

18. The sanitary faucet (1) according to claim 14, wherein the first control element (5) is connected to the control disk (3) via a second transmission (8).

19. The sanitary faucet (1) according to claim 14, wherein the valve (9) can be adjusted between an open position and a closed position (12) by pressing the second control element (11).

20. The sanitary faucet (1) according to claim 14, wherein a volumetric flow rate of the mixed water can be set by turning the second control element (11).

21. The sanitary faucet (1) according to claim 20, wherein the second control element (11) can rotate about the second axis of rotation (6).

\* \* \* \* \*